(12) United States Patent
Eberl et al.

(10) Patent No.: US 7,862,903 B2
(45) Date of Patent: Jan. 4, 2011

(54) MONOLITHIC AND BI-FUNCTIONAL EXTRUDED STRUCTURAL ELEMENT

(75) Inventors: Frank Eberl, Le Fontanil (FR); Joêl Maussion, Trelaze (FR)

(73) Assignee: Alcan Rhenalu, Paris (FR)

( * ) Notice: Subject to any disclaimer, the term of this patent is extended or adjusted under 35 U.S.C. 154(b) by 1034 days.

(21) Appl. No.: 11/259,094

(22) Filed: Oct. 27, 2005

(65) Prior Publication Data
US 2006/0118213 A1  Jun. 8, 2006

(30) Foreign Application Priority Data
Oct. 27, 2004  (FR) .................................. 04 11442

(51) Int. Cl.
B64C 1/00 (2006.01)
B23K 28/00 (2006.01)
B21C 23/00 (2006.01)
B21C 23/22 (2006.01)

(52) U.S. Cl. ...................................... 428/654; 148/535

(58) Field of Classification Search ....................... None
See application file for complete search history.

(56) References Cited

U.S. PATENT DOCUMENTS

| 2,798,604 | A | | 7/1957 | Todd |
| 3,482,003 | A | | 12/1969 | Levan |
| 5,841,098 | A | * | 11/1998 | Gedrat et al. ........... 219/121.63 |
| 6,082,073 | A | | 7/2000 | Silvanus et al. |
| 2002/0134889 | A1 | * | 9/2002 | Schmidt et al. .............. 244/133 |
| 2004/0056075 | A1 | * | 3/2004 | Gheorghe .................... 228/199 |
| 2007/0128463 | A1 | * | 6/2007 | Dixon et al. ................. 428/654 |

FOREIGN PATENT DOCUMENTS

| EP | 58569 A2 * | 8/1982 |
| EP | 0508434 | 10/1992 |
| EP | 508434 A1 * | 10/1992 |

* cited by examiner

*Primary Examiner*—Aaron Austin
(74) *Attorney, Agent, or Firm*—Baker Donelson Bearman Caldwell & Berkowitz, PC (57) ABSTRACT

The invention relates to a bi-functional extruded structural element, particularly a stringer for aeronautical construction, comprising a base that can be fixed on a surface, and a body, wherein the base comprises a first aluminum-based alloy, and further wherein the body comprises a second heat treatable aluminum-based alloy, having properties that are different from the properties of the first aluminum based alloy.

79 Claims, 10 Drawing Sheets

MONOLITHIC AND BI-FUNCTIONAL EXTRUDED STRUCTURAL ELEMENT

CROSS REFERENCE TO RELATED APPLICATIONS

This application claims priority to FR 0 411 442 filed Oct. 27, 2004, the content of which is incorporated by reference in its entirety.

BACKGROUND OF THE INVENTION

1. Field of the Invention

The invention relates to a new manufacturing process for extruded bi-functional structural elements made of aluminium alloy, and structural elements produced by this process. The invention is particularly useful for the manufacture of weldable stringers for aeronautical construction.

2. State of the Art

Metal structural elements of an aircraft are currently assembled essentially by riveting. Welding is hardly used, because aluminium alloys with high mechanical properties such as Al—Cu—Mg type alloys in the 2xxx series and Al—Zn—Cu—Mg type alloys in the 7xxx series cannot be welded satisfactorily by fusion. On the other hand, most alloys in the 5xxx and 6xxx series can be welded by fusion. Among these alloys, the 6056 and 6156 alloys are used for aircraft structural elements, but more frequently they are assembled together by riveting. It is only recently that the fuselage skin made of a 6056 alloy has been welded onto extruded stringers made of a 6056 alloy, to assemble the fuselage of Airbus A318 and A380 aircraft. It is impossible at the moment to weld a fusion weldable alloy (such as 6056) to another alloy considered to be not weldable by fusion (such as 7349); the only way to make such an assembly in normal industrial practice is by riveting. According to the prior art, a welding assembly of two parts made from different alloys usually imposes restrictions on the choices of alloys. As far as the fastening of stringers and wink skin is concerned, this restriction concerns the alloy chosen for the stringers and for the skin. Taking into account these restrictions may necessitate optimizing a property balance if these alloys need to be assembled by welding, and preferably by fusion welding (such as MIG, TIG, laser welding) which is not possible for every alloy and notably not with all heat treatable alloys. As far as friction stir welding is concerned, it is possible to weld most aluminium alloys but with restrictions on the geometric configuration of the welded joint. The "property balance" as used in the art generally refers to a balance between the properties collected under the umbrella term as "static mechanical properties" (particularly the ultimate tensile strength UTS and the yield stress YS), on the one hand, and properties relating to "damage tolerance" (particularly toughness and resistance to fatigue crack propagation) on the other hand. However, even an optimized property balance generally provides structural elements which exhibit lower global performances. It would be advantageous in terms of cost and weight to be able to select an alloy with high mechanical properties for the stringers, an alloy with high damage tolerance for the wing skin and to weld them together. A solution for assembling such structural elements by welding can significantly simplify the assembly of an aircraft.

SUMMARY OF THE INVENTION

A problem that the present invention was aimed to solve was to make it possible to manufacture monolithic and bi-functional structural elements comprising two different alloys and more particularly to weld a structural element made of a heat treatable and fusion weldable aluminium alloy (such as a fuselage skin made of an AA6056 alloy sheet) and a structural element made of a heat treatable aluminium alloy considered to be not fusion weldable (such as an extruded stringer made of the AA7349 alloy) together.

In accordance with the present invention there is provided an extruded structural element, particularly a stringer for aeronautical construction comprising (i) a base that can be fixed onto a surface, for example by welding or by any other method, and (ii) a body. The base comprises a first aluminium-based alloy and the body comprises a second aluminium-based alloy, that is heat-treatable and has properties that are different from the properties of first aluminium-based alloy.

In further accordance with the present invention, there is provided a manufacturing process for an extruded structural element. The process involves:

(a) preparing a hollow cylindrical extrusion billet comprising an internal tube comprising a first aluminium-based alloy and an external tube comprising a second heat treatable aluminium-based alloy, (b) extruding a hollow tube comprising a plurality of ribs on a mandrel, such that at least a portion of the straight or complex shaped ribs comprise the second alloy, while the hollow tube comprises the first alloy, to form a product, (c) cutting out the product so as to obtain an extruded structural element comprising a base made of the first alloy and a body made of the second heat-treatable alloy optionally followed by machining.

In yet further accordance with the instant invention is the provision of a process for manufacturing a welded structural element that is suitable for aeronautical construction. The process comprises:

(a) fusion welding an extruded structural element onto a structural element comprising a heat treatable aluminium alloy, (b) optionally conducting a heat treatment on the welded structural element.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

DETAILED DESCRIPTION OF A PREFERRED EMBODIMENT

Definitions

Unless mentioned otherwise, all information about the chemical composition of alloys is expressed in percent by mass. Consequently, in a mathematical expression such as for example, "0.4 Zn," this means 0.4 times the zinc content expressed as a mass percent; this applies mutatis mutandis (that is, in the same way) to other chemical elements. The designation of alloys follows the rules of The Aluminium Association, known to those skilled in the art. Metallurgical tempers are defined in European standard EN 515. The chemical composition of normalized aluminium alloys is defined, for example, in standard EN 573-3. Unless mentioned otherwise, the static mechanical properties, in other words the ultimate tensile strength $R_m$ or UTS, the tensile yield stress $R_{p0.2}$ or TYS, and the elongation at rupture A, are determined by a tensile test according to standard EN 10002-1, the location and direction at which the test pieces are taken being defined in standard EN 755-1.

The definitions in European standard EN 12258-1 are applicable unless mentioned otherwise. The term "sheet" is used in the present application to designate any and all thicknesses of rolled products.

The term "machining" includes any material removal process such as but not limited to turning, milling, drilling, boring, tapping, electroerosion, grinding, polishing. The term "extruded tube" includes tubular products including but not limited to extruded and drawn tubes.

In the instant description, a "structural element" in a mechanical construction means any mechanical part for which failure could endanger the safety of the construction, and/or its users, passengers and/or others who could be impacted.

For an aircraft, these structural elements include in particular elements making up the fuselage (such as the fuselage skin, fuselage stiffeners or stringers, bulkheads, circumferential frames), wings (such as the wing skin), stringers or stiffeners, ribs and spars, and the tail fin is composed particularly of horizontal and vertical stabilisers, and floor beams, seat tracks and doors.

In accordance with the present invention, the term "monolithic structural element" refers to a structural element that is generally obtained by machining from a single piece of rolled, extruded, hand forged and/or cast partly finished product with little or no assembly such as riveting, welding, bonding, with another part.

The term "bi-functional structural element" as used in accordance with the present invention generally refers to functions conferred by metallurgic characteristics of the product or element, as opposed to functions of its geometric shape.

The term "aluminum-based alloy" means a metal alloy wherein aluminum is the main component, in other words, of all the elements in the alloy, aluminum is present in the highest percentage by weight.

One advantageous embodiment of the present invention may provide a solution to a problem in the art whereby fastening by welding can now be achieved. In particular, such welding notably involves fusion welding between a structural element comprising a heat treatable aluminium alloy and a structural element comprising a heat treatable aluminium alloy which is not known as being fusion weldable.

According to the invention, a problem in the art can be addressed or solved by the use of an extruded structural element comprising at least two co-extruded alloys in which the base (in other words the part that will be fixed onto the surface of another structural element (E) to form a structural element (G)), comprises an alloy (B). For example, alloy (B) can comprise the same alloy as the alloy to which it is to be fixed, while the body that forms the rest of the extruded structural element (F) may be a high strength mechanical alloy (A). The alloy (B) may be a heat treatable alloy. The alloy (A) may also advantageously be a heat treatable alloy, so that the structural element (G) formed by assembly between the structural elements (F) and (E) may be used in aeronautical construction. Therefore, such an extruded structural element (F) according to the present invention is bi-functional, in the sense that its body has properties that satisfy certain metallurgical requirements, and these properties of the body are significantly different from those properties of its base.

The alloy (B) is preferably a weldable alloy, particularly fusion weldable, so that the assembly between the extruded structural element (F) according to the invention and the structural element (E) may be assembled by welding. The alloy (B) may, in one embodiment be an alloy in the 6xxx, 5xxx or 4xxx series. The alloy (A) does not need to be weldable, but it can be weldable if desired for any reason.

The present invention may be applied to any combination of alloys based on extrudable aluminium. In one preferred embodiment, the alloy (A) comprises an alloy in the 7xxx series, and is preferably at least one selected from 7049, 7149, 7249, 7349, 7449, 7050, 7055, 7075, 7036, 7068, and/or 7136 alloys and alloy (B) is at least one selected from fusion weldable alloys 6056, 6056A, 6156, 6013, 6060, 6110, 5005, 5083, and/or 5086. Other Al—Zn—Cu—Mg type alloys can also be used for the alloy (A), and in some embodiments particularly high zinc content (>8.7%) alloys may be employed.

In another embodiment of the invention which is more general than the particular problem mentioned above, an alloy (B) can be chosen that is not known as being fusion weldable, but which may optionally be weldable by friction stir welding. Thus, a bi-functional extruded structural element (F) is obtained. For example, in an extruded structural element (F) in which the body must satisfy static mechanical properties and the base must have fatigue resistance and/or good damage tolerance (toughness, crack propagation, etc.), the alloy (A) can comprise at least one selected from alloys 7049, 7149, 7249, 7349, 7449, 7050, 7055, 7075, 7068, and 7036, while alloy (B) comprises an alloy in the 2xxx series, and can be at least one selected from 2024, 2024A, 2056, 2124, 2224, 2324, 2424, and 2524 alloys. In this embodiment, structural elements (F) and (E) are not necessarily assembled by welding, but can be assembled, for example, by traditional riveting methods. This type of bi-functional structural element can also be used in direct applications, i.e. applications that do not typically require assembly with other structural elements.

An extruded structural element (F) according to the invention can be fabricated by any desired process such as by a process comprising:

(a) preparing a hollow cylindrical extrusion billet comprising an external tube comprising a heat treatable aluminium-based alloy (A) and an internal tube made of an aluminium-based alloy (B), (b) extruding a hollow tube comprising a plurality of ribs on a mandrel, such that at least a portion and preferably most (at least 75%) of the straight or complex shaped ribs comprise alloy (A), while the hollow tube comprises alloy (B), (c) cutting out the product derived from step (b) and optionally machining the product, so as to obtain a structural element (F) comprising a base comprising alloy (B) and a body comprising alloy (A).

Figure 6:
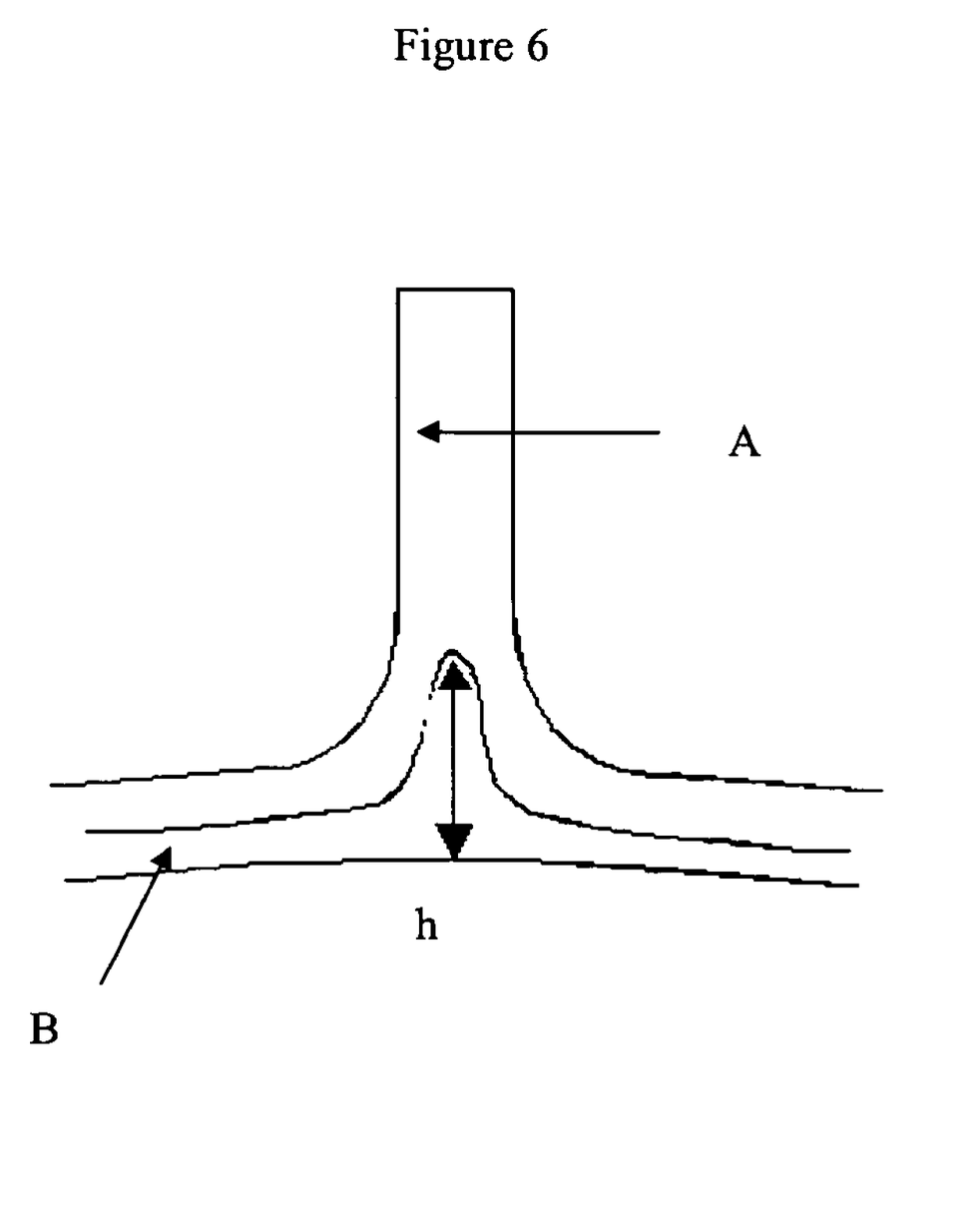
FIG. 6 defines the penetration height h (see double arrow) of alloy (B) of the base into the body made of alloy (A) of the extruded structural element (F).

According to this advantageous process, an advantageous first step is to make a composite hollow billet preferably with axial symmetry that concentrically comprises two tubes with a circular cross-section. The internal tube comprising an alloy (B) with outside diameter D is inserted into the external tube comprising an alloy (A) with inside diameter D. This insertion may be made, for example, by hot expansion of the external tube. However, it is preferable in some cases to work by cold contraction of the internal tube. It was observed that use of a cold contraction process results in a greater pull-out force on the extruded structural element (F). It was further noticed that it is desirable that the deviation from axial symmetry in the composite hollow billet be as small as possible, since it generally has a direct repercussion on the symmetry of the cross-section of the extruded hollow tube, and particularly on how constant the thickness of the internal wall is, as well as the penetration depth (defined in FIG. 6) of alloy (B) into the body of the structural element (F).

The cut out in step (c) may be made using any known technique(s). Preferably a longitudinal cut out is employed to obtain long segments of the extruded structural element, and these segments can be cut to the required length. Thus, the ribs of the extruded hollow tube become the body of the structural element (F), while the hollow tube itself becomes its base. It may be advantageous to finish the base by machining.

Thus, a monolithic and bi-functional structural element (F) is obtained, in which for example the body has particularly high static mechanical strength properties (that is the body preferably has a yield stress $R_{p0,2}$ at least about 600 MPa and particularly preferably at least about 650 MPa), while, for example, the base has a particularly high fatigue strength, and/or the base possesses an engineering property of being fusion weldable.

Structural elements of the present invention also in some embodiments have a base with a yield stress of at least about 575 MPa, an ultimate strength $R_m$ of at least about 600 MPa, particularly preferably at least about 640 MPa and an elongation at rupture A of at least about 10%. The body preferably has an elongation at rupture of at least about 6%, and an ultimate strength of at least about 700 MPa, particularly preferably about 720 MPa.

Figure 3:
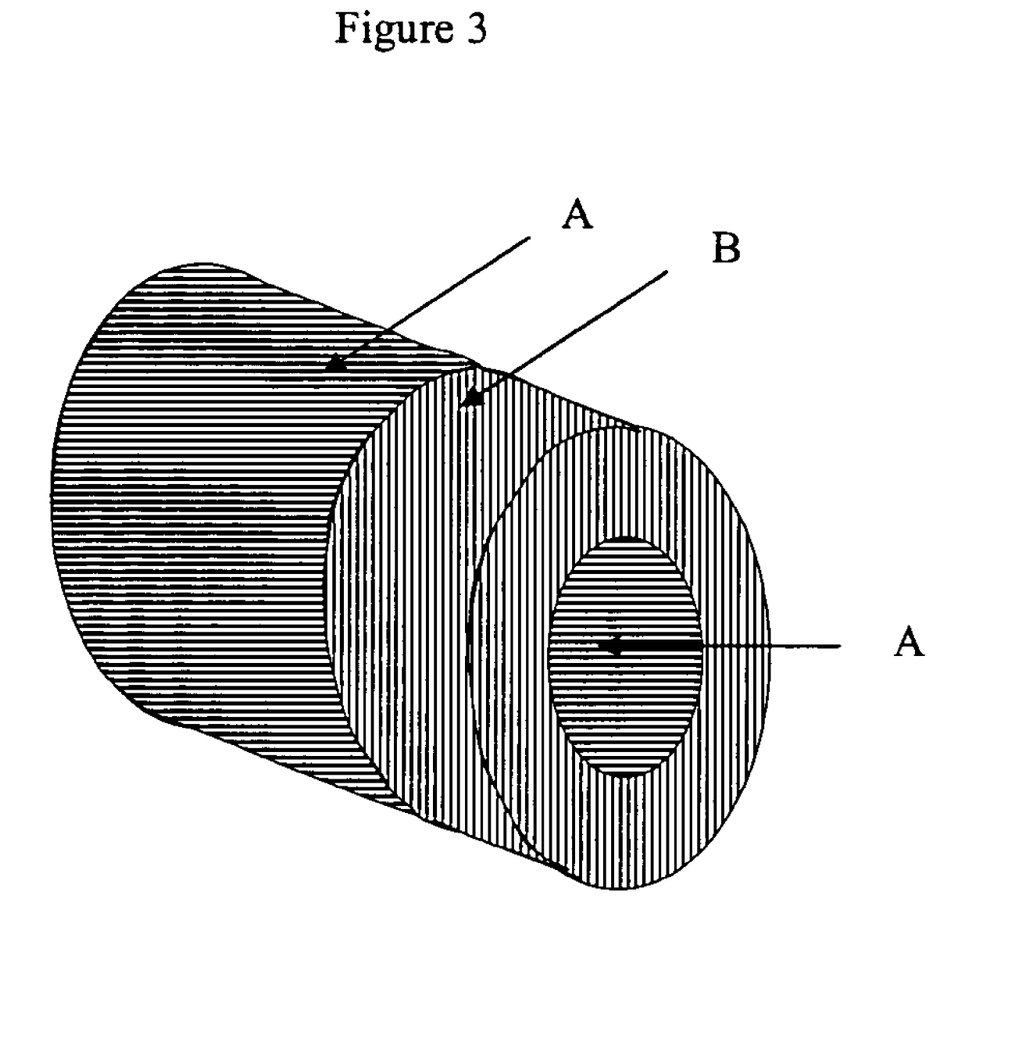
FIG. 3 diagrammatically shows a composite extrusion billet used to make the extruded structural element (F) according to the invention, but which is not a preferred mode of execution. It comprises an alloy (A) and an alloy (B).

An extruded structural element (F) according to the present invention may also be made using any other process that provides a sufficiently strong metallurgical connection between the base and the body, as characterised by the body pull-out force. In this regard, the structural element (F) should preferably have a body pull-out force of at least about 300 MPa and particularly preferably at least about 350 MPa. The process described above based on extrusion on a mandrel of a composite hollow billet with axial symmetry, may provide better results than using a sequentially assembled billet from two billets with the same outside diameter (FIG. 3). This is because in the extrusion of a sequentially assembled billet, there can be a strong material loss at the extrusion front and also because material flow can be difficult to control. Extrusion on a mandrel is generally not used when such a billet according to FIG. 3 is used. A concentric tube including at least two extruded and possibly machined tubes can also be used instead of a cast billet if desired.

One advantage of using a composite hollow billet with axial symmetry is that such a process ensures good homogeneity of the extruded product, and particularly a fairly constant distribution of the two alloys on the base and the body of the extruded structural element (F) as a function of the length of the extruded hollow tube. In one embodiment the height h (defined in FIG. 6) decreases from about 6 mm to about 3 mm, between the beginning and the end of the hollow tube extruded from a composite hollow billet with axial symmetry. This slight non-homogeneity does not appear to have any appreciable adverse effect on the usage properties of the structural element (F). It has also been observed that the use of an inverse extrusion process for a composite hollow billet with axial symmetry as described above minimizes this non-homogeneity.

A process according to the instant invention provides a method for manufacturing a structural element (G) by welding a extruded structural element (F) with another structural element (E), in which the application of a pull-out force to the body of the structural element (F) will not normally cause a break between the body and the base. This means that there is no observed mechanical weakness at the interface between alloys (A) and (B).

The use of an extruded structural element (F) according to the present invention makes it very easy to manufacture large structural elements (G). For example, an extruded structural element (F) may be a stringer welded onto a sheet. More generally, the present invention may include a manufacturing process for a welded structural element (G), particularly for aeronautical construction, the process comprising:

(a) fusion welding an extruded structural element (F) onto a structural product or element made of a heat treatable aluminum alloy, (b) optionally applying a heat treatment to the welded structural element (G).

Such a welded structural element (G) may comprise, for example, a fuselage element of an aircraft.

Figure 8:
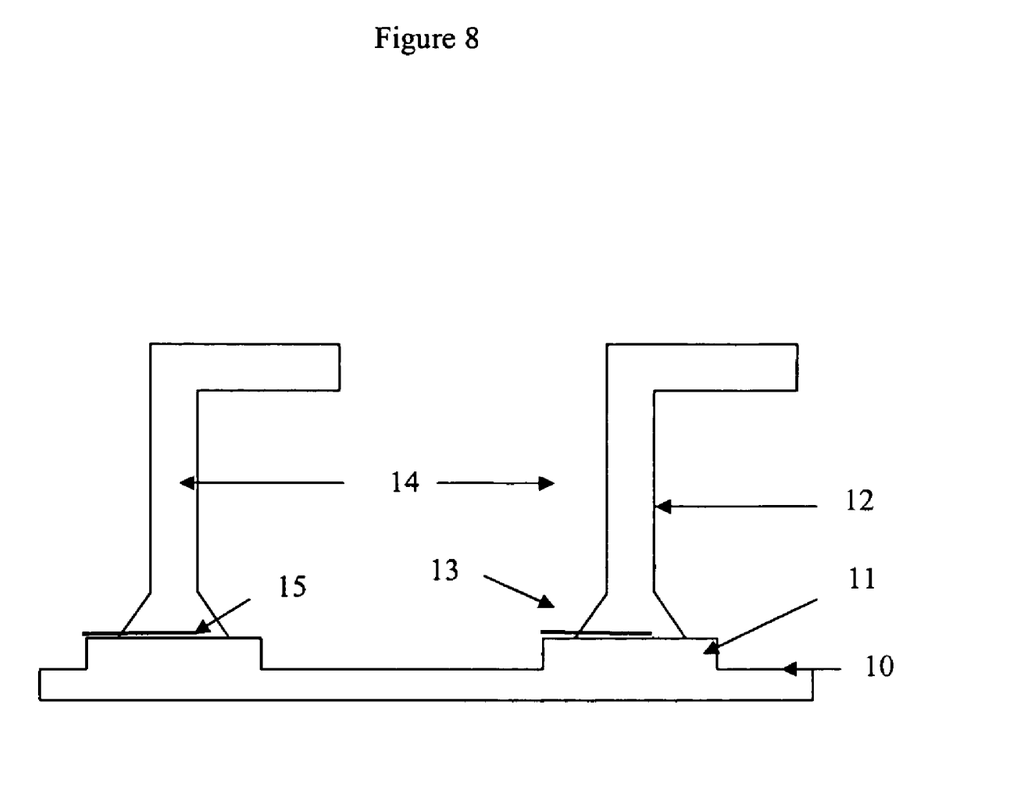
FIGS. 8, 9 and 10 show different modes of employment of the cross-section according to the invention.

FIG. 8 shows a fuselage panel (10) representing a product (E), on which one of the surfaces (11) was machined. An extruded structural element (F) according to the present invention (mark 12) with a base (13) made of a weldable alloy and a body (14) was welded onto the product (E) including the formation of a welded zone (15).

A final heat treatment was conducted done on the welded part, particularly to improve the behavior in corrosion. In general, annealing heat treatments may be additive. Consequently, the heat treated temper of the structural elements (F) and (E) should advantageously be chosen so that the heat treatment leads to a satisfactory final temper of the structural element (G) after welding. For example a pre-aging treatment may be carried out on one element or the other. In one embodiment, a stringer comprising a 7xxx alloy typically requires annealing for a shorter total time than a partly finished product made from a 6xxx alloy. If the sheets comprise a 6xxx alloy and the stringers comprise a 7xxx alloy, the sheets made from a 6xxx alloy can advantageously be pre-annealed before welding, since the duration of the heat treatment that they can resist after welding is limited by the shorter duration of the annealing treatment to be applied to the 7xxx alloy stringers after welding.

Figure 10:
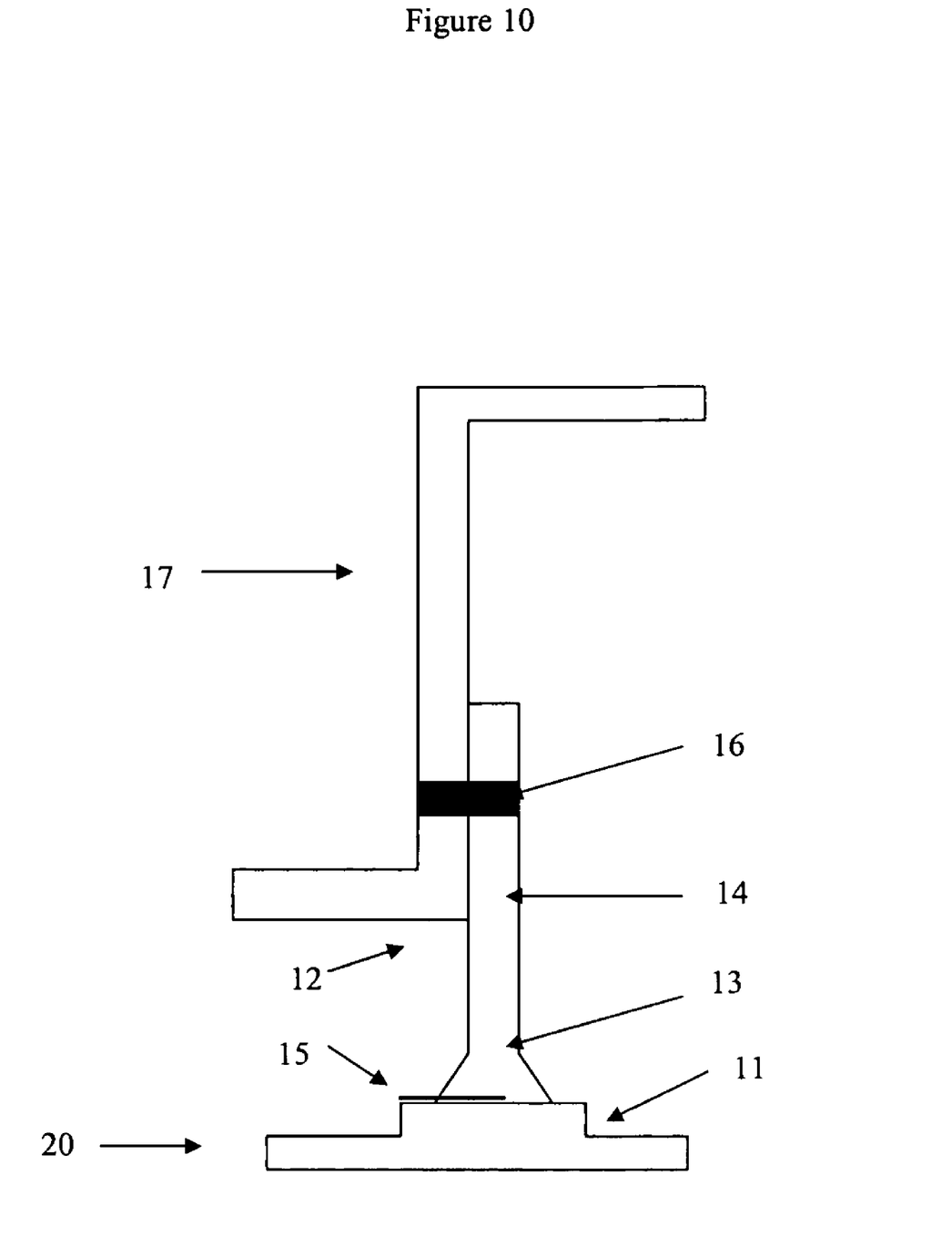

In order to produce even more complex structural elements, the body of the extruded structural element (F) that is made of an alloy (A) and that is fixed for example by welding or riveting onto a structural element or product (E) that can for example be fixed onto other products by riveting or bolting. This usually assumes that the shape of the body of the extruded structural element (F) is suitable for this assembly type. This assembly method is illustrated, for example, in FIG. 10 that shows a product (20) representing the product (E), one of the surfaces (11) of which was machined. An extruded structural element (F) according to the invention (mark 12), with a base (13) made of a weldable alloy and a body (14), was welded onto the product (E), including the formation of a welded zone (15). The body (14) of the extruded structural element is fixed (for example by riveting (16)) onto another structural element (17). Such a complex structural element may be used, for example, in aeronautical construction for the assembly of circumferential frames. In such a case, the body (14) of a bi-functional extruded section (F) according to the instant invention (12) can comprise an alloy in the 2xxx series, and the base (13) can comprise a 4xxx, 5xxx or 7xxx alloy, the product (20) is the fuselage skin, (12) is a shear web, and (17) is the frame.

Figure 9:
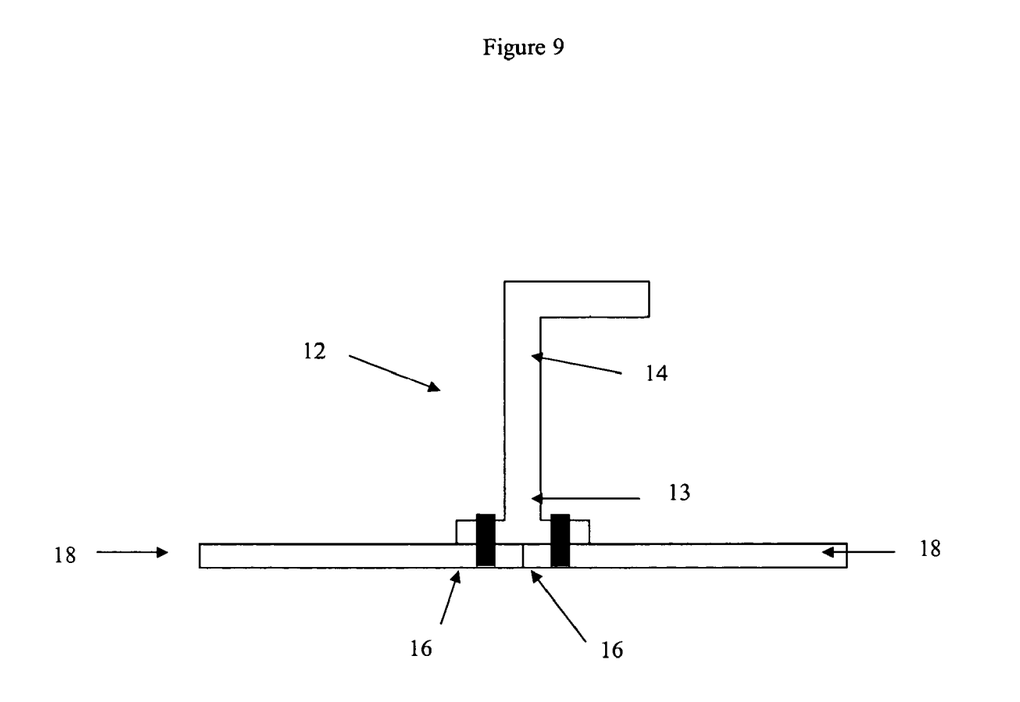

FIG. 9 shows a suitable method for making a structural element (G) from a bi-functional extruded structural element (F) according to the instant invention by riveting. The bi-functional structural element (12) has a high mechanical strength body (14) made of an alloy in the 7xxx series, and a base (13) made of an alloy in the 2xxx series with high tolerance to damage. The base (13) is fixed onto two adjacent structural elements (E) (mark 18) by rivets (16). This type of structural element (G) may be used, for example, for the construction of an aircraft fuselage.

Other embodiments of this invention are described in the following claims.

Advantageous embodiments of the invention are described in the following examples for illustration purposes. These examples are not in any way limitative.

Example

In this example, extruded structural elements were made from an AA7349 alloy body and a base made from an AA6056 alloy (reference P6) or an AA5086 alloy (reference P5).

A hollow extrusion billet was prepared comprising an external concentric part made of an AA7349 alloy and an internal concentric part made of an AA6056 or AA5086 alloy as follows: a first billet made of the AA7349 alloy is cast, and a cylinder was machined in this billet with an outside diameter of 189 mm. A duct with a circular cross-section (diameter D) was formed in this cylinder such that the longitudinal axis of the cylinder and the longitudinal axis of the duct are coincident. The said duct passes through the entire length of the said cylinder.

A cylinder was prepared starting from a second billet made of an AA6056 or AA5086 alloy, with an outside diameter D and a circular cross-section duct (diameter d) such that the longitudinal axis of the cylinder and the longitudinal axis of the duct were coincident. The said duct passes along the entire length of the said cylinder.

Figure 1:
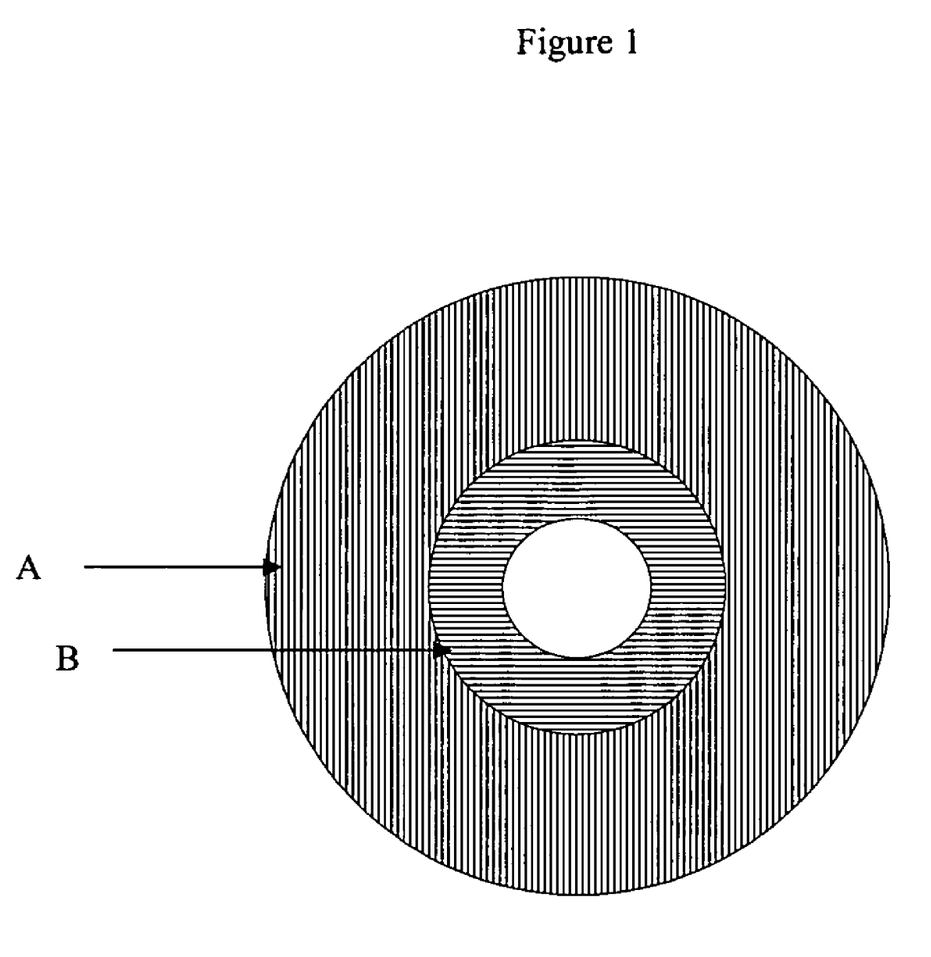
FIG. 1 shows the cross-section through a composite hollow billet with axial symmetry used to extrude a hollow tube. It comprises an alloy (A) and an alloy (B).
Figure 2:
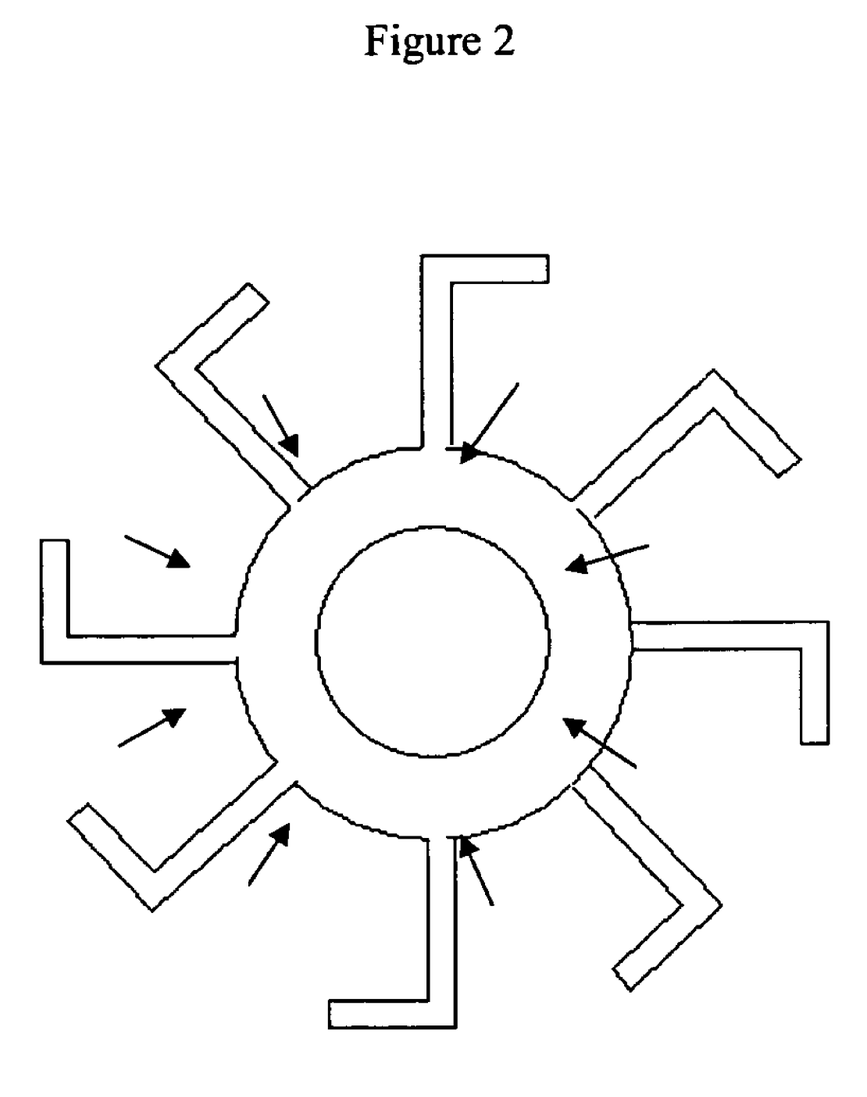
FIG. 2 shows the cross-section of an extruded hollow tube used to obtain by longitudinal cutting (indicated by the arrows) the extruded structural element (F) according to the invention.

The result was thus two hollow cylindrical tubes, one made of a 7349 alloy and the other made of an AA6056 or AA5086 alloy with D=85 mm and d=53 mm. After hot expansion at 120° C. of the tube made from 7349 alloy, the tube made from 6056 alloy was inserted in the tube made from 7349 alloy. The result was a hollow cylindrical billet with a cross-section as shown diagrammatically in FIG. 1. It was extruded on a mandrel by direct extrusion at a block temperature of 420° C. The cross-section of the extruded section is shown in FIG. 2. In this example, the extrusion ratio was 11. The section obtained was cut along the direction of its length: thus, one section length gives eight stringer lengths (see FIG. 2).

For each type of stringer (reference P5 or P6), the body and the base in the T76 temper have been characterised by their yield stress $R_{p0.2}$, their ultimate strength $R_m$ and their elongation at rupture A, see tables 1 and 2. For comparison, Table 3 gives the same type of results for a stringer obtained by direct extrusion on a mandrel with a single piece billet (reference P7) made of an AA7349 alloy. Extrusion conditions were comparable to conditions for references P5 and P6. Therefore, the base and the body for this stringer P7 are both made of the AA7349 alloy.

TABLE 1

| | | Base (alloy AA5086) | | | Body (alloy AA7349) | | |
|---|---|---|---|---|---|---|---|
| Reference | Mark | $R_{p0.2}$ [MPa] | $R_m$ [MPa] | A % | $R_{p0.2}$ [MPa] | $R_m$ [MPa] | A [%] |
| P5 | 1 | 595 | 659 | 12.8 | 670 | 724 | 7.7 |
| P5 | 2 | 593 | 659 | 11.2 | 666 | 723 | 7.7 |
| P5 | 3 | 589 | 653 | 11.7 | 665 | 720 | 6.6 |
| P5 | 4 | 581 | 648 | 10.9 | 665 | 721 | 7.0 |
| P5 | 5 | 578 | 646 | 10.1 | 665 | 722 | 8.4 |
| P5 | 6 | 586 | 652 | 11.9 | 669 | 727 | 8.5 |
| P5 | 7 | 585 | 650 | 12.2 | 664 | 722 | 8.2 |
| P5 | 8 | 589 | 653 | 13.0 | 668 | 726 | 7.8 |
| Average | | 587 | 653 | 11.7 | 667 | 723 | 7.7 |

TABLE 2

| | | Base (alloy AA6056) | | | Body (alloy AA7349) | | |
|---|---|---|---|---|---|---|---|
| Reference | Mark | $R_{p0.2}$ [MPa] | $R_m$ [MPa] | A % | $R_{p0.2}$ [MPa] | $R_m$ [MPa] | A % |
| P6 | 1 | 593 | 656 | 10.9 | 669 | 725 | 7.8 |
| P6 | 2 | 595 | 658 | 12.7 | 666 | 722 | 9.5 |
| P6 | 3 | 596 | 660 | 11.9 | 677 | 731 | 7.6 |
| P6 | 4 | 597 | 663 | 11.8 | 672 | 725 | 7.0 |
| P6 | 5 | 594 | 658 | 10.8 | 674 | 726 | 6.1 |
| P6 | 6 | 593 | 655 | 10.0 | 673 | 725 | 6.4 |
| P6 | 7 | 595 | 661 | 11.1 | 677 | 728 | 6.4 |
| P6 | 8 | 597 | 662 | 11.9 | 673 | 727 | 6.9 |
| Average | | 595 | 659 | 11.4 | 673 | 726 | 7.2 |

TABLE 3

| | | Base (alloy AA7349) | | | Body (alloy AA7349) | | |
|---|---|---|---|---|---|---|---|
| Reference | Mark | $R_{p0.2}$ [MPa] | $R_m$ [MPa] | A % | $R_{p0.2}$ [MPa] | $R_m$ [MPa] | A % |
| P7 | 1 | 597 | 665 | 11.1 | 669 | 724 | 11.1 |
| P7 | 2 | 599 | 667 | 13.4 | 674 | 729 | 11.6 |
| P7 | 3 | 602 | 664 | 14.3 | 678 | 731 | 10.3 |
| P7 | 4 | 593 | 660 | 12.9 | 676 | 730 | 10.7 |
| P7 | 5 | 594 | 661 | 13.3 | 669 | 723 | 9.5 |
| P7 | 6 | 599 | 666 | 13.6 | 676 | 733 | 11.3 |
| P7 | 7 | 598 | 665 | 13.1 | 676 | 732 | 11.6 |
| P7 | 8 | 596 | 667 | 12.7 | 670 | 725 | 11.3 |
| Average | | 597 | 664 | 13.0 | 674 | 728 | 10.9 |

Figure 7:
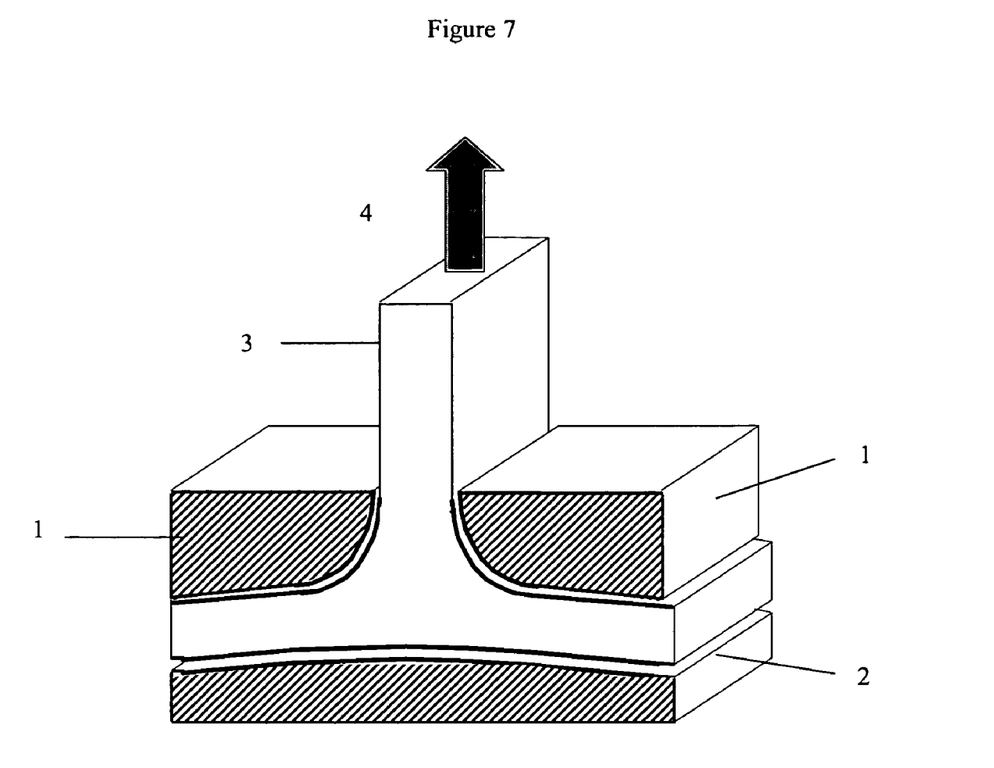
FIG. 7 diagrammatically shows the device used to measure the force needed to pull-out the body of the section.

The quality of the metallurgical connection between the two alloys (A) and (B) was characterized by measuring the pull-out force of the body of the structural element when the base is fixed in a rigid support device. This device is shown diagrammatically in FIG. 7. A cross-section of the structural element (F) to be tested was cut out and fixed between the jaws 1, 2. The shape of the jaws was adapted to the curvature of the product to try to provide as perfect contact as can be reasonably obtained between the jaws and the test piece. The body 3 of the product was gripped between the jaws (not shown in the FIG. 7) of a tensile machine, at a sufficient distance from the jaws. A pull-out force 4 was applied and increased until the product to be tested failed. The force was recorded. A tension stress can be calculated approximately by dividing the force by the cross-section A. The results of this pull-out test are given in Tables 4, 5 and 6.

TABLE 4

| Reference | Mark | Pull-out force (N) | Pull-out stress [MPa] |
|---|---|---|---|
| P5 | 1 | 32691 | 382 |
| P5 | 2 | 29481 | 344 |
| P5 | 3 | 33860 | 397 |
| P5 | 4 | 33641 | 389 |
| P5 | 5 | 34354 | 399 |
| P5 | 6 | 33218 | 391 |
| P5 | 7 | 31673 | 372 |
| P5 | 8 | 30530 | 355 |

TABLE 5

| Reference | Mark | Pull-out force (N) | Pull-out stress [MPa] |
|---|---|---|---|
| P6 | 1 | 33125 | 384 |
| P6 | 2 | 28642 | 333 |
| P6 | 3 | 28399 | 329 |
| P6 | 4 | 29690 | 344 |
| P6 | 5 | 37197 | 434 |
| P6 | 6 | 34993 | 406 |
| P6 | 7 | 36528 | 425 |
| P6 | 8 | 32394 | 377 |

TABLE 6

| Reference | Mark | Pull-out force (N) | Pull-out stress [MPa] |
|---|---|---|---|
| P7 | 1 | 47616 | 554 |
| P7 | 2 | 47333 | 550 |
| P7 | 3 | 51164 | 595 |
| P7 | 4 | 52700 | 613 |
| P7 | 5 | 54283 | 631 |
| P7 | 6 | 52877 | 615 |
| P7 | 7 | 51907 | 604 |
| P7 | 8 | 48213 | 561 |

Figure 4:
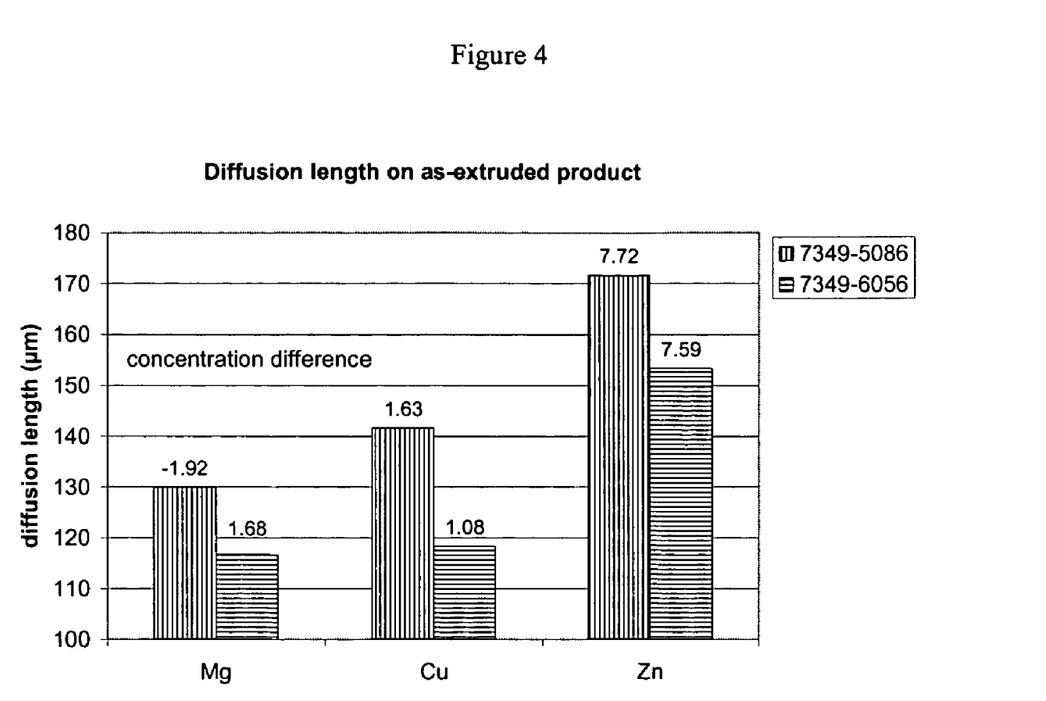
FIG. 4 shows the width of the diffusion zone between alloys (A) and (B) for two pairs of alloys, AA7349/AA5086 (reference P5) and AA7349/AA6056 (reference P6), and three monitored chemical elements, namely magnesium, copper and zinc. The width of the diffusion zone D in the extruded product is defined as the width between the points for which the composition changes by 0.1 weight percent from the nominal composition of the element in the analysed product.
Figure 5:
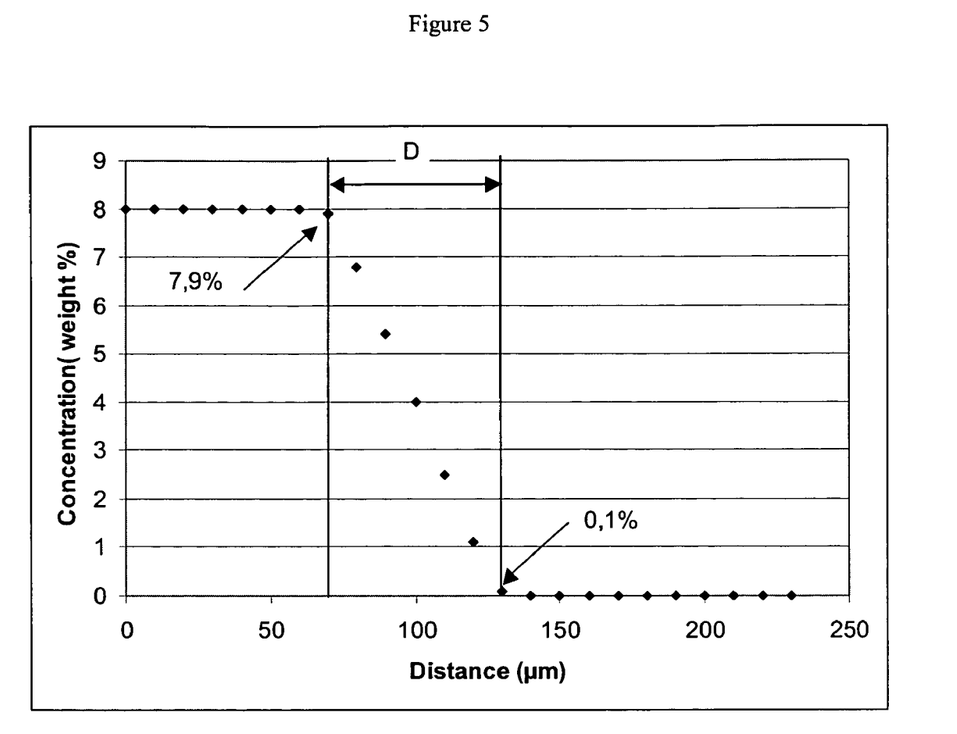
FIG. 5 shows an example of the diffusion zone width D.

It was observed on P5 and P6, using optical microscopy before solution heat treatment, that the interface between the base and the body was very clean: virtually no mix of the two alloys (A) and (B) was observed, but there was a diffusion zone with a width not exceeding 180 µm for reference P5, and 160 µm for reference P6. This is clear in FIG. 4, that shows the length of the diffusion zone determined by electron probe microanalysis for a representative hollow tube for two combinations of alloys (A) and (B) and three monitored elements, namely magnesium, copper and zinc.

Additional advantages, features and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims and their equivalents.

All documents referred to herein are specifically incorporated herein by reference in their entireties.

As used herein and in the following claims, articles such as "the", "a" and "an" can connote the singular or plural.

The invention claimed is:

1. A monolithic extruded structural element capable for use as a stringer for aeronautical construction, said element comprising
a base that can be fixed onto a surface,
and a body,
wherein said base comprises a first aluminium-based alloy
and wherein said body comprises a second heat treatable, aluminium-based alloy having properties different from the properties of the first aluminum-based alloy, and wherein the monolithic extruded structural element comprises an extruded element comprising at least two co-extruded alloys that is obtained by machining from a single piece of extruded partly finished product without assembly, and further wherein said structural element includes a diffusion zone that is at least about 116 µm wide.

2. A structural element according to claim 1, wherein the first aluminium-based alloy is fusion weldable.

3. A structural element according to claim 1, wherein the second heat treatable, alloy comprises an alloy from the group 7xxx.

4. A structural element according to claim 3, wherein the second heat treatable alloy is at least one selected from the group consisting of 7049, 7149, 7249, 7349, 7449, 7050, 7055, 7075, 7068, 7036 and 7136 alloys.

5. A structural element according to claim 1, wherein the first alloy comprises at least one alloy in the 6xxx, 5xxx and/or 4xxx group.

6. A structural element according to claim 5, wherein the first alloy is at least one selected from the group consisting of 6056, 6056A, 6156, 6060, 6013, 6110, 5005, 5083 and 5086 alloys.

7. A manufacturing process for an extruded structural element having a diffusion zone that is at least about 116 µm wide and that is suitable for aeronautical construction comprising: preparing a hollow cylindrical extrusion billet with axial symmetry comprising an internal tube comprising a first aluminium-based alloy, and an external tube comprising a second heat treatable, aluminium-based alloy, co-extruding the alloys to form a hollow tube on a mandrel comprising a plurality of ribs, such that at least a portion of said ribs comprise said second heat treatable, alloy, while the wall of the hollow tube comprises said first alloy, to form a product, cutting out the product and optionally machining said product, so as to obtain a structural element comprising a base comprising said first alloy and a body comprising said second heat treatable alloy.

8. A process according to claim 7, further comprising inserting said internal tube comprising said first aluminium-based alloy into said external tube comprising said second heat treatable aluminium-based alloy by cold contraction of the said internal tube.

9. A process according to claim 7, wherein said extruding comprises inverse extrusion.

10. A process according to claim 7, wherein said first alloy comprises a fusion weldable alloy.

11. A process according to claim 7, wherein said second heat treatable alloy is at least one selected from the group consisting of 7049, 7149, 7249, 7349, 7449, 7050, 7055, 7075, 7068, 7036, and 7136 alloys.

12. A process according to claim 7, wherein said first alloy is at least one selected from the group consisting of 6056, 6056A, 6156, 6060, 6013, 6110, 5005, 5083, 5086 alloys.

13. A process according to claim 11, wherein said first alloy is at least one selected from the group consisting of 2024, 2024A, 2056, 2124, 2224, 2324, 2424, and 2524 alloys.

14. A manufacturing process for preparing a structural element suitable for aeronautical construction comprising welding an extruded structural element according to claim 1 onto a structural product or element comprising a heat treatable aluminium alloy, to obtain a welded structural element, optionally performing a heat treatment on said welded structural element.

15. A structural element according to claim 2, wherein the second heat-treatable alloy comprises at least one alloy in the 6xxx, 5xxx and/or 4xxx group.

16. A structural element according to claim 3, wherein the second heat-treatable alloy comprises at least one alloy in the 6xxx, 5xxx and/or 4xxx group.

17. A structural element according to claim 2, wherein the first alloy is at least one selected from the group consisting of 6056, 6056A, 6156, 6060, 6013, 6110, 5005, 5083 and 5086 alloys.

18. A structural element according to claim 3, wherein the first alloy is at least one selected from the group consisting of 6056, 6056A, 6156, 6060, 6013, 6110, 5005, 5083, and 5086 alloys.

19. A process according to claim 8, wherein said first alloy comprises a fusion weldable alloy.

20. A process according to claim 9, wherein said first alloy comprises a fusion weldable alloy.

21. A manufacturing process for preparing a structural element suitable for aeronautical construction comprising fusion welding an extruded structural element according to claim 2 onto a structural product or element comprising a heat treatable aluminium alloy, to obtain a welded structural element, optionally performing a heat treatment on said welded structural element.

22. A manufacturing process for preparing a structural element suitable for aeronautical construction comprising welding an extruded structural element according to claim 5 onto a structural product or element comprising a heat treatable aluminium alloy, to obtain a welded structural element, optionally performing a heat treatment on said welded structural element.

23. A manufacturing process for preparing a structural element suitable for aeronautical construction comprising welding an extruded structural element according to claim 3 onto a structural product or element comprising a heat treatable aluminium alloy, to obtain a welded structural element, optionally performing a heat treatment on said welded structural element.

24. A manufacturing process for preparing a structural element suitable for aeronautical construction comprising welding an extruded structural element according to claim 4 onto a structural product or element comprising a heat treatable aluminium alloy, to obtain a welded structural element, optionally performing a heat treatment on said welded structural element.

25. A structural element made by a process according to claim 21.

26. An aeronautical part comprising a structural element made by a process of claim 21.

27. A structural element made by a process according to claim 14.

28. An aeronautical part comprising a structural element made by a process of claim 14.

29. A structural element according to claim 1 that comprises a monolithic and bi-functional structural element, wherein the body has a yield stress $R_{p0,2}$ of at least about 600 MPa and said base is fusion-weldable.

30. A structural element according to claim 29 wherein the yield stress is at least about 650 MPa.

31. A structural element according to claim 2 that comprises a monolithic and bi-functional structural element, wherein the body has a yield stress $R_{p0,2}$ of at least about 600 MPa and said base is fusion-weldable.

32. A structural element according to claim 31 wherein the yield stress is at least about 650 MPa.

33. A structural element according to claim 3 that comprises a monolithic and bi-functional structural element, wherein the body has a yield stress $R_{p0,2}$ of at least about 600 MPa and said base is fusion-weldable.

34. A structural element according to claim 33 wherein the yield stress is at least about 650 MPa.

35. A structural element according to claim 4 that comprises a monolithic and bi-functional structural element, wherein the body has a yield stress $R_{p0,2}$ of at least about 600 MPa and said base is fusion-weldable.

36. A structural element according to claim 35 wherein the yield stress is at least about 650 MPa.

37. A structural element according to claim 5 that comprises a monolithic and bi-functional structural element, wherein the body has a yield stress $R_{p0,2}$ of at least about 600 MPa and said base is fusion-weldable.

38. A structural element according to claim 37 wherein the yield stress is at least about 650 MPa.

39. A structural element according to claim 6 that comprises a monolithic and bi-functional structural element, wherein the body has a yield stress $R_{p0,2}$ of at least about 600 MPa and said base is fusion-weldable.

40. A structural element according to claim 39 wherein the yield stress is at least about 650 MPa.

41. A structural element of claim 1 that has a body pull-out force of at least about 300 MPa.

42. A structural element of claim 41 that has a body pull out force of at least about 350 MPa.

43. A structural element of claim 2 that has a body pull-out force of at least about 300 MPa.

44. A structural element of claim 43 that has a body pull out force of at least about 350 MPa.

45. A structural element of claim 3 that has a body pull-out force of at least about 300 MPa.

46. A structural element of claim 45 that has a body pull out force of at least about 350 MPa.

47. A structural element of claim 4 that has a body pull-out force of at least about 300 MPa.

48. A structural element of claim 47 that has a body pull out force of at least about 350 MPa.

49. A structural element of claim 5 that has a body pull-out force of at least about 300 MPa.

50. A structural element of claim 49 that has a body pull out force of at least about 350 MPa.

51. A structural element of claim 6 that has a body pull-out force of at least about 300 MPa.

52. A structural element of claim 51 that has a body pull out force of at least about 350 MPa.

53. A structural element of claim 29 that has a body pull-out force of at least about 300 MPa.

54. A structural element of claim 53 that has a body pull out force of at least about 350 MPa.

55. A structural element of claim 31 that has a body pull-out force of at least about 300 MPa.

56. A structural element of claim 55 that has a body pull out force of at least about 350 MPa.

57. A structural element of claim 33 that has a body pull-out force of at least about 300 MPa.

58. A structural element of claim 57 that has a body pull out force of at least about 350 MPa.

59. A structural element of claim 35 that has a body pull-out force of at least about 300 MPa.

60. A structural element of claim 59 that has a body pull out force of at least about 350 MPa.

61. A structural element of claim 37 that has a body pull-out force of at least about 300 MPa.

62. A structural element of claim 61 that has a body pull out force of at least about 350 MPa.

63. A structural element of claim 39 that has a body pull-out force of at least about 300 MPa.

64. A structural element of claim 63 that has a body pull out force of at least about 350 MPa.

65. A structural element suitable for aeronautical construction prepared by a process comprising welding an extruded structural element according to claim 1 onto a structural product or element comprising a heat treatable aluminum alloy, to obtain a welded structural element, optionally performing a heat treatment on said welded structural element.

66. A structural element according to claim 41 that comprises a monolithic and bi-functional structural element, wherein the body has a yield stress $R_{p0,2}$ of at least about 600 MPa and said base is fusion-weldable.

67. A structural element according to claim 66 wherein the yield stress is at least about 650 MPa.

68. A fuselage element comprising a structural element of claim 1.

69. A fuselage element comprising a structural element of claim 2.

70. A fuselage element comprising a structural element of claim 3.

71. A fuselage element comprising a structural element of claim 29.

72. A fuselage element comprising a structural element of claim 31.

73. A fuselage element comprising a structural element of claim 33.

74. A fuselage element comprising a structural element of claim 35.

75. A fuselage element comprising a structural element of claim 37.

76. A fuselage element comprising a structural element of claim 39.

77. A manufacturing process for preparing a structural element suitable for aeronautical construction comprising fixing an extruded structural element according to claim 1 onto a structural product comprising a heat treatable aluminium alloy, to obtain a final structural element, optionally performing a heat treatment on said final structural element.

78. A process according to claim 77, wherein said fixing comprises fusion welding.

79. A process according to claim 77, wherein said fixing comprises riveting.

* * * * *